June 24, 1930.  J. YACKLEY  1,767,162
COMBINATION CULTIVATOR, WEEDER, AND PULVERIZER
Filed June 7, 1929  2 Sheets-Sheet 2
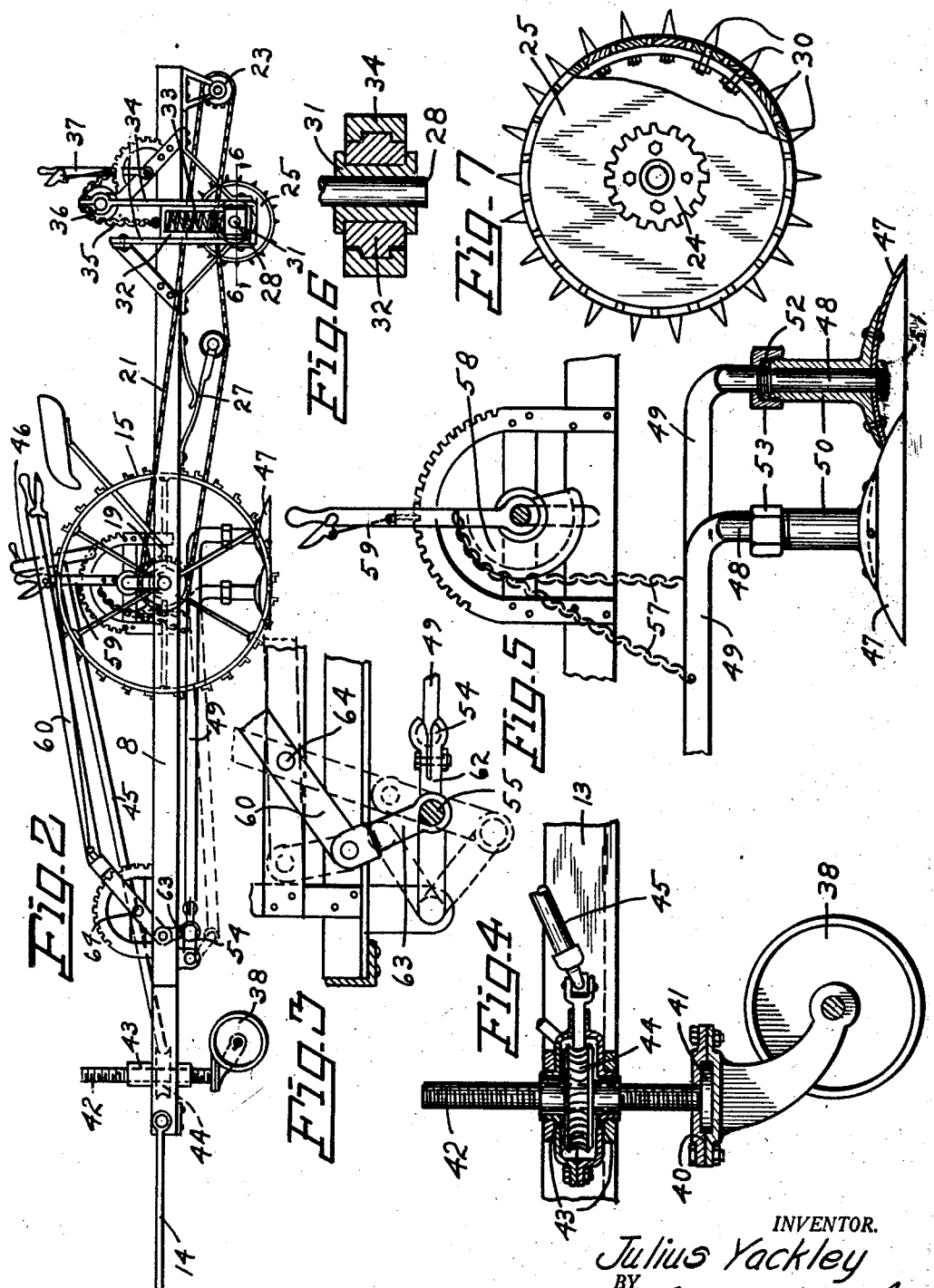
INVENTOR.
Julius Yackley
BY
Glenn L. Fish
ATTORNEYS.

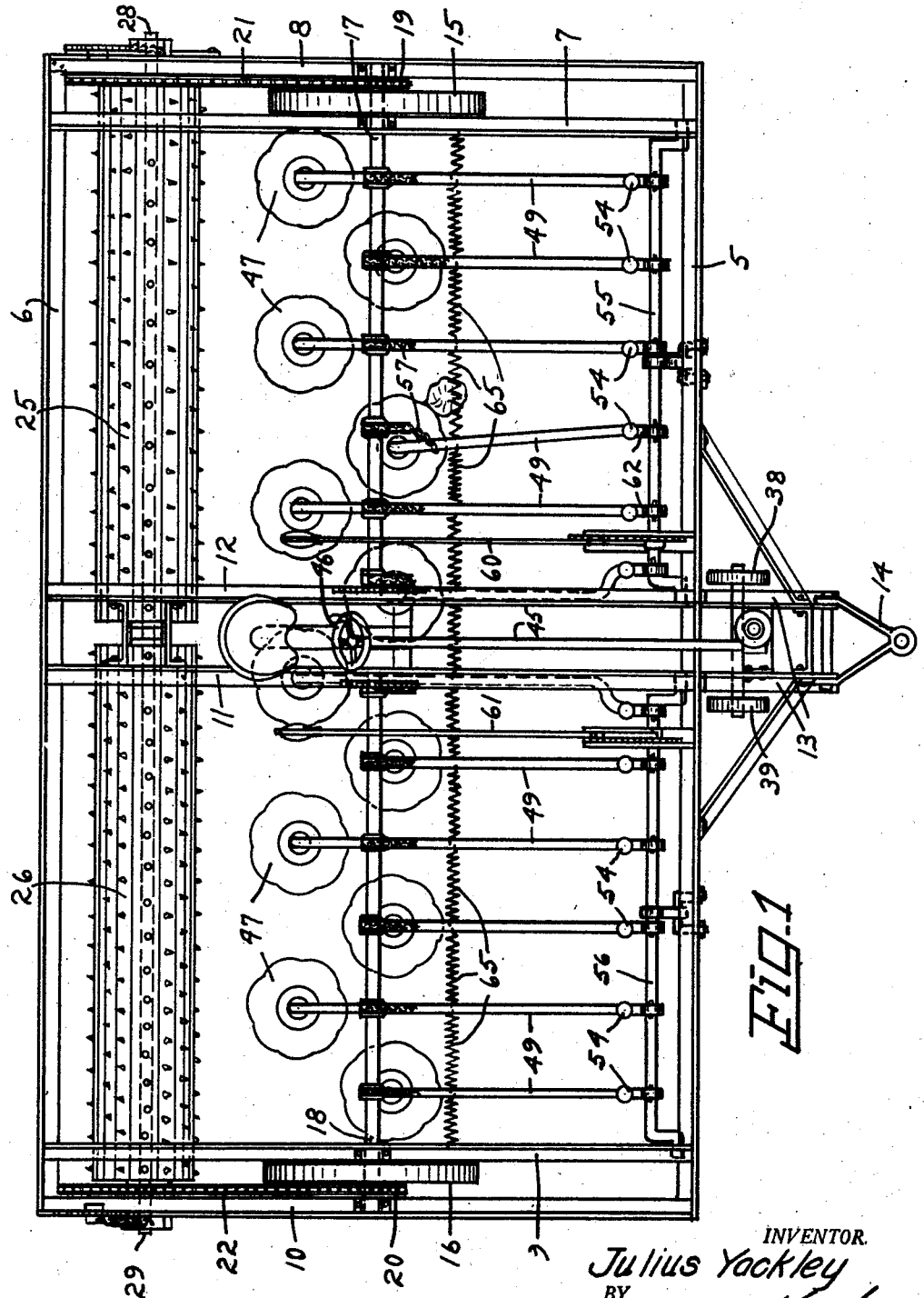

Patented June 24, 1930

1,767,162

UNITED STATES PATENT OFFICE

JULIUS YACKLEY, OF SPOKANE, WASHINGTON

COMBINATION CULTIVATOR, WEEDER, AND PULVERIZER

Application filed June 7, 1929. Serial No. 369,059.

My invention relates to combination cultivators, weeders, and pulverizers and certain objects of the invention are to provide a machine that will effectively break up the soil, lift the weeds and free them from dirt, pulverize the soil and pack it smoothly in place. Further objects are to provide means for raising and lowering the forward end of the machine, means for raising and lowering the weeder, pulverizer and packer drums, means for raising and lowering the cultivator discs, and means for tilting said discs forward and backward.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:

Figure 1 is a top plan view of the machine;

Fig. 2 is a view in side elevation of the same;

Fig. 3 is a detail view in elevation showing the means for tilting the cultivator discs;

Fig. 4 is a detail view partly in section and partly in elevation showing the means for raising and lowering the forward end of the machine;

Fig. 5 is a view in side elevation showing the means for raising and lowering the cultivator discs;

Fig. 6 is a detail view in horizontal section taken on a broken line 6, 6 of Fig. 2; and Fig. 7 is a view in end elevation of one of the weeder, pulverizer, and packer drums.

Referring to the drawings throughout which like reference numerals designate like parts, the frame of the machine comprises forward and rear beams 5 and 6 respectively that are held in spaced relation by spaced side end beams 7 and 8, 9 and 10 and by spaced central beams 11 and 12. The central beams extend forward of the beam 5, as at 13, where they are properly strengthened by braces and spreaders, and a clevis or other means such as shown at 14 is provided at the forward end of said beams whereby the device may be drawn over the ground as will be understood.

The weight of the machine is mainly supported by a pair of tractor wheels designated by the numerals 15 and 16 that are mounted on shafts 17 and 18 which are journaled in bearings secured to the beams 7, 8, 9, 10, 11 and 12. Sprockets 19 and 20 are fixed to said shafts or tractor wheels and chains 21 and 22 extend therefrom to idler sprockets 23 mounted on the rear end corners of the machine frame as shown in Fig. 2. Said chains engage the upper teeth of sprockets 24 that are fixed to relatively large drums 25 and 26 and double spring roller devices such as shown at 27 retain said chains in engagement with said sprockets.

The drums 25 and 26 revolve freely and independently on shafts 28 and 29 and will obviously be caused to rotate in directions that are opposite to the rotations of the wheels 15 and 16. Said drums are provided with relatively long sharp spikes 30 that are adapted to pick up weeds, shake the dirt from their roots and deposit them on the surface of the ground where they will be dried out by the sun. Said drums and spikes are also adapted to pulverize and pack the soil which has been previously broken up by the cultivator discs as hereinafter set forth.

The drum shafts 28 and 29 are supported in box bearings 31 at either end which are mounted in frames 32. Springs 33 normally retain said bearings in the downward position and at the same time permit movement of the drums 25 and 26 when they encounter such obstacles as rocks or uneven ground. The frames 32 are slidably mounted in guide frames 34 and a chain 35 is secured to the tops of said frames 32 which passes over a guide pulley 36 and is secured to a hand lever 37 whereby the drums may be raised free of the ground as will be understood.

The forward end of the machine is supported by castors 38 and 39. Referring to Fig. 4 said castors are provided with bearings 40 which enclose discs 41 formed on the ends of their spindles 42 whereby they may turn freely and independently. Said spindles are threaded and are slidably mounted in bearings 43 fixed to the forward beam end portions 13. Said spindles threadedly pass through worm gears 44 mounted in said bearings and which are engaged by the worm end of a rod 45 having a wheel 46 fixed to its remote end. By turning said wheel it will be obvious that the forward end of the machine may be raised or lowered as desired.

Referring particularly to Fig. 5, the cultivator discs 47 have scalloped cutting edges and are mounted on the downturned finger end portions 48 of arms 49. By means of sleeves 50 riveted to said discs and which serve as bearings for said finger portions said discs revolve freely and are retained in place by nuts 51 on their lower ends and by nuts 52 adjacent the upper ends of said sleeves with an outside nut 53 threaded over the ends of said sleeves to exclude dust and other foreign matter.

The arms 49 are connected through universal joints 54 to eccentric rods 55 and 56 journaled to the frames of the machine. Chains 57 extend from said arms over grooved cams 58 to hand levers 59. It will thus be obvious that by shifting said levers forward or backward the arms 49 with their discs 47 will be lowered or raised.

For the purpose of tilting the discs 47 forward to make them cut into the ground or backward to free them from cutting into the ground a lever 60 is used for the eccentric rod 55 and a corresponding lever 61 for the eccentric rod 56. The extended portions 62 of the universal joints 54 are keyed to said eccentric rods and links 63 connect said eccentric rods with the ends of the levers 60 and 61 which are pivoted at 64. By shifting said levers it will be apparent that said eccentric rods will be pivotally raised or lowered as indicated in full and dotted lines in Figs. 2 and 3 of the drawings. By lowering said rods the discs will, by means of the arms 49, be tilted forward and by raising said rods the discs will be tilted backward as will be understood. Spacer springs 65 are interposed between the arms 49 for the purpose of retaining said arms normally in their proper spaced relation.

It will now be apparent that I have provided a machine that will break up the soil, free it from weeds, pulverize and pack the broken soil, and which embodies control and adjustment means for each of its functional elements. Having thus described my invention, it being understood that minor changes may be resorted to in its construction without departing from its scope and spirit, what I claim and desire to secure by Letters Patent of the United States is:

1. A combination cultivator weeder and pulverizer comprising a frame, a pair of tractor wheels, two relatively large spiked drums mounted for independent rotation at the rear of the frame, a chain drive arranged to rotate said drums in directions contrary to the directions of rotation of the tractor wheels, two sets of cultivator discs mounted on substantially vertical axes in opposite halves of the frame, means for raising and lowering said discs, and means for tilting said discs forward and backward.

2. A combination cultivator weeder and pulverizer comprising a frame, a pair of tractor wheels, two relatively large spiked drums mounted for independent rotation at the rear of the frame, a chain drive arranged to rotate said drums in directions contrary to the directions of rotation of the tractor wheels, spring frame box bearings for the drums, means for raising and lowering said drums, two sets of cultivator discs mounted on substantially vertical axes in opposite halves of the frame, means for raising and lowering said discs, and means for tilting said discs forwards and backwards.

3. A combination cultivator weeder and pulverizer comprising a frame, a pair of tractor wheels, two relatively large spiked drums mounted for independent rotation at the rear of the frame, a chain drive arranged to rotate said drums in directions contrary to the directions of rotation of the tractor wheels, spring frame box bearings for the drums, means for raising and lowering said drums, two sets of cultivator discs mounted on substantially vertical axes in opposite halves of the frame, means for raising and lowering said discs, means for tilting said discs forwards and backwards, a pair of castors for the forward end of the machine arranged to turn freely and independently, and means connected with said castors for raising and lowering the forward end of the machine.

In testimony whereof I affix my signature.

JULIUS YACKLEY.